UNITED STATES PATENT OFFICE.

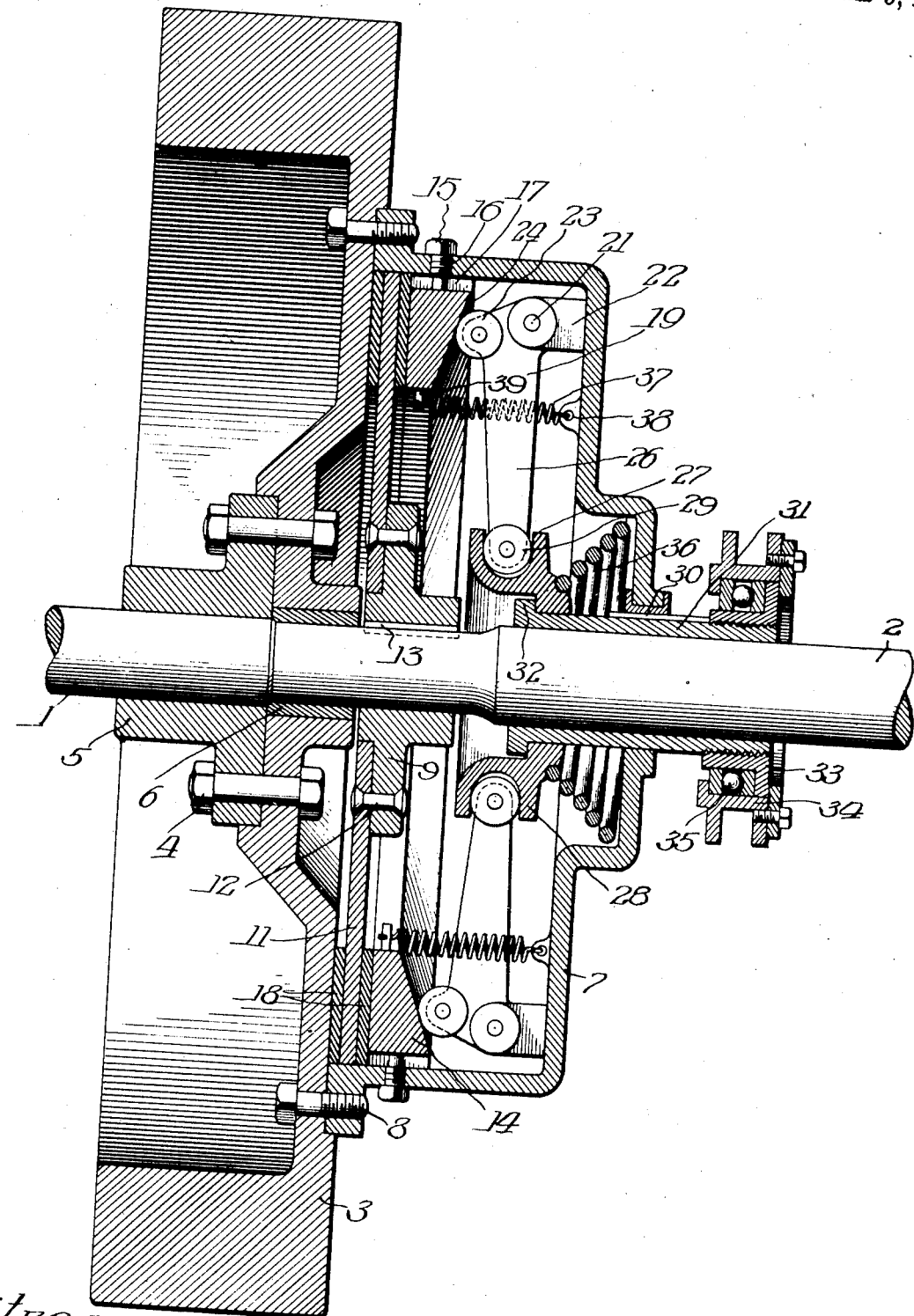

GUSTAVE C. NELSON, OF MOLINE, ILLINOIS, ASSIGNOR TO THE BORG & BECK COMPANY, OF MOLINE, ILLINOIS, A CORPORATION OF ILLINOIS.

FRICTION-CLUTCH.

1,099,509.

Specification of Letters Patent. Patented June 9, 1914.

Application filed March 14, 1913. Serial No. 754,212.

*To all whom it may concern:*

Be it known that I, GUSTAVE C. NELSON, a citizen of the United States, residing in Moline, in the county of Rock Island and State of Illinois, have invented certain new and useful Improvements in Friction-Clutches, of which the following is a specification.

This invention relates to friction clutches and aims to provide a friction clutch of new and improved construction particularly adapted for use in motor driven vehicles and the like.

One of the objects of the invention is to provide a friction clutch wherein the driving and driven shafts may be frictionally connected by simple devices so constructed and arranged that the strength of the frictional engagement will increase with the running speed of the motor.

A further object of the invention is to so construct and arrange the parts of the clutch that wear thereof within relatively wide limits will not require reconstruction or readjustment of the clutch.

A still further object of the invention is to provide a friction clutch for automobiles and the like wherein the driving and driven elements will be promptly separated when the clutch is thrown out, reducing thereby the duty of the brake which is ordinarily provided upon the driven shaft of an automobile to bring the shaft to rest after the clutch has been thrown out.

An additional object of the invention is to provide a clutch wherein the various devices, when in inoperative positions, will be firmly held and prevented from rattling.

Other objects and advantages of the invention will be apparent as it is better understood from the following description taken in connection with the accompanying drawing illustrating a preferred embodiment thereof.

On the drawing: the figure is a longitudinal sectional view of a clutch embodying my invention.

Referring to the drawings, 1 designates the driving shaft and 2 the driven shaft. A fly-wheel 3 is fastened by means of bolts 4 to a collar 5 fixed upon the shaft 1, so that the fly-wheel rotates continuously with the shaft 1 and with it constitutes the driving element of the clutch. In the present instance the end of the shaft 2 adjacent the shaft 1 is supported in a pilot bearing 6 at the center of the fly-wheel. A casing 7 embracing the shaft 2 is fixed to the fly-wheel 3 by means of a plurality of bolts or other suitable fastening means 8 so that the casing rotates with the fly-wheel and with the shaft 1.

A collar 9, upon which is fastened the friction disk 11 by means of bolts or rivets 12, is splined upon the driven shaft 2 at 13. A thrust ring 14 of diameter equal substantially to the internal diameter of the casing is mounted within the casing adjacent the disk 11. This ring is free to slide longitudinally of the casing and is held against rotation relatively thereto by driving studs 15 threaded through the cylindrical wall of the casing at 16 and taking into grooves 17 extending transversely of the outer cylindrical face of the ring. A pair of rings 18 of asbestos or other frictional material are preferably provided, one between the adjacent faces of the fly-wheel 3 and the disk 11 and the other between the adjacent faces of the disk 11 and the thrust ring 14. These friction rings may be secured to the disk 11 or to the fly-wheel 3 and thrust ring 14, or they may merely rest between the opposed faces of these members.

The thrust ring 14 is moved toward the left, viewing the figure, to establish a frictional connection between the thrust ring, disk and fly-wheel when the clutch is thrown in by means of a plurality of bell cranks 19 pivoted at 21 in lugs or ears 22 secured to the inner surfaces of the rear wall of the casing. Each of the bell cranks 19 has an arm preferably provided with a roller 23 adapted to bear against the adjacent face 24 of the thrust ring, the roller being at all times disposed nearer the axes of rotation of the shafts 1 and 2 than the pivotal connection of the bell crank so that outward movement of the bell crank about its pivot 21 will swing the roller outwardly from the axes of rotation of the shafts, causing it to roll over the face 24 of the thrust ring and move the thrust ring toward the fly-wheel. In order that the bell cranks may give greater movement to the thrust ring the face 24 of the thrust ring is preferably inclined or beveled from its inner edge to its outer edge, as seen in the figure. The other longer arm of each bell crank extends inwardly of the casing toward the axes of rotation of the shafts and terminates in an annular groove 27 in a collar 28 where it may be provided with a roller 29 loosely fitting in the groove. The collar 28 is mounted upon and embraces a clutch throw-out sleeve 31 loose upon the shaft 2 and slidably connected to the rear wall of the casing by a driving spline 30. At its end adjacent the end of the shaft the sleeve 31 is provided with an outwardly extending flange 32 adapted when the sleeve is moved toward the right, viewing the figure, to engage the collar 28 and pull the bell cranks about their pivots to throw out the clutch. A collar 33 is threaded upon the end of the sleeve 31 and this collar is connected to a yoke 34 by anti-friction bearing 35. The yoke 34 does not rotate and is adapted to be moved longitudinally of the shaft by a suitable clutch lever (not shown). When the yoke is moved toward the left, viewing the figure, to throw in the clutch, the collar 28 is caused to follow the flange 32 by a spiral spring 36 which is interposed for this purpose between the rear wall of the casing 7 and the adjacent face of the collar 28.

When the clutch is thrown in, the spring 36 acts through the collar 28 and upon the arms 26 of the bell cranks, moving them about their pivotal axes so that the rollers 23 roll up the beveled face 24 of the thrust ring 14 and move the thrust ring longitudinally of the shafts toward the fly-wheel and frictionally connect the thrust ring, disk and fly-wheel. When the sleeve 31 is moved to throw out the clutch the bell cranks are moved in the opposite direction and cease to press upon the thrust ring. In order that the frictional engagement may be immediately broken when the clutch is thrown out, a plurality of springs 37 are fastened at their ends to lugs 38 upon the casing and to lugs 39 on the thrust ring, the springs 37 pulling the thrust ring toward the rear wall of the casing so that the thrust ring follows the rollers as they are retracted by the throw-out sleeve 31. These springs also serve to prevent the rollers, bell cranks and other relatively moving parts of the clutch from rattling when the clutch is inoperative as they cause the thrust ring to firmly press all of the rollers and the bell cranks into firm contact with their connected parts.

The bell cranks are preferably mounted within the casing so that the center of gravity of each is permanently disposed to the left, viewing the figure, of the plane of rotation of its pivotal axis, so that as the driving shaft 1 rotates, the bell cranks will be pulled about their pivotal connections with the casing by centrifugal force aiding the spring 36 to hold the transmission parts of the clutch in firm frictional contact. It is apparent, moreover, that any increase in the speed of the driving element will automatically be accompanied by an increased tenacity of engagement between the surfaces of the disk, fly-wheel and thrust ring, as the degree of centrifugal force exerted upon the bell crank is proportionate to the speed at which the casing and bell cranks rotate. It will be noted also that the asbestos rings 18 may wear appreciably without requiring that new asbestos rings be provided, as the rollers 23 may travel across the beveled face of the thrust ring 14 between limits farther from the center of the ring than were the limits between which these rollers moved when the asbestos rings were new, it only being necessary to replace the rings when the outer limit of travel of the rollers will carry them past the line of maximum pressure.

It is believed that the invention and many of its attendant advantages will be apparent from the foregoing without further description and it will be apparent that numerous changes may be made in the form, arrangement and construction of the parts without departing from the spirit or scope of the invention or sacrificing any of its material advantages, the form herein before disclosed being merely one preferred embodiment thereof.

I claim:

1. In a friction clutch, the combination of a driving element, a driven element, a casing fixed to one element and embracing the other element, a member mounted within and movable longitudinally of the casing, and a bell crank pivoted within the casing and having an arm engaging the said member inwardly of the pivot of the bell crank, said member being constructed to increase the throw of said bell crank.

2. In a friction clutch, the combination of a driving element, a driven element, a casing fixed to one element and embracing the other element, a member mounted within and movable longitudinally of said casing, and a bell crank pivoted within the casing and having an arm positioned to slide over a face of the said member and to move the said member when the bell crank is moved about its pivot, the face over which said bell crank slides being deflected from a plane at right angles to the axis of said member.

3. In a friction clutch, the combination of a driving element, a driven element, a casing secured to one element and embracing the other, a member mounted within the casing to move longitudinally thereof and having a beveled face, and a bell crank pivoted within the casing and having an arm positioned to engage said face of the member and slide thereacross when the bell crank is moved, moving the said member to frictionally engage the elements.

4. In a friction clutch, the combination of a driving element, a driven element, a casing fixed to one element and embracing the other element, a member mounted within the casing to move longitudinally thereof and having a flat face and a beveled face inclined toward the said casing, and a bell crank pivoted within the casing and having an arm positioned to engage the said beveled face and to slide thereacross when the bell crank is moved, moving the said member to frictionally engage the elements.

5. In a friction clutch, the combination of a driving element, a driven element, a casing fixed to one element and embracing the other element, a thrust member mounted within the casing to move longitudinally thereof and adapted to establish frictional engagement between the elements, a bell crank positioned between the rear wall of the casing and the said member, a spring connected to the said rear wall of the casing and to the said member for maintaining the said member and bell crank immovable when the said member and bell crank are in inoperative positions, and a second spring of greater strength than the first-mentioned spring for moving said bell crank toward said member and against the action of said first-mentioned spring.

6. In a friction clutch, the combination of a driving element, a driven element, a casing fixed to one of said elements and embracing the other element, and a bell crank mounted within said casing to rotate therewith and adapted to move about its pivot to establish frictional engagement between the elements, said bell crank being pivoted without the plane of its rotation of its center of gravity and outwardly of the path of travel of its center of gravity, whereby said bell crank is pulled by centrifugal force to increase the frictional engagement between the elements as the clutch rotates.

7. In a friction clutch, the combination of a driving element, a driven element, a casing fixed to one of said elements and embracing the other element, a member mounted within the casing to move longitudinally thereof and adapted to establish frictional engagement between said elements, and a bell crank mounted within the casing to rotate therewith and adapted to move the said member, said bell crank being pivoted without the plane of rotation of its center of gravity and outwardly of the path of travel of its center of gravity, whereby said bell crank is pulled by centrifugal force against the said member as the clutch rotates.

8. In a friction clutch, the combination of a driving element, a driven element, a casing fixed to one element and embracing the other element, a member mounted within the casing to move longitudinally thereof and adapted to establish frictional engagement between the elements, and a plurality of bell cranks mounted within and rotatable with the said casing, said bell cranks being pivoted in a plane parallel to the plane of their centers of gravity and outwardly of the path of travel of its center of gravity, whereby said bell cranks are pulled by centrifugal force against said member as the clutch rotates.

GUSTAVE C. NELSON.

Witnesses:
C. W. BORG,
ALGOT W. ALLISON.